(12) United States Patent
Brachmann et al.

(10) Patent No.: US 10,794,538 B2
(45) Date of Patent: Oct. 6, 2020

(54) PROCESS FOR REFILLING A GAS TANK AND GAS SUPPLY SYSTEM

(71) Applicant: HONDA MOTOR CO., LTD., Tokyo (JP)

(72) Inventors: Thomas Brachmann, Offenbach/am Main (DE); Frederic Barth, Paris (FR)

(73) Assignee: HONDA MOTOR CO., LTD., Tokyo (JP)

( * ) Notice: Subject to any disclaimer, the term of this patent is extended or adjusted under 35 U.S.C. 154(b) by 221 days.

(21) Appl. No.: 16/060,654

(22) PCT Filed: Dec. 7, 2016

(86) PCT No.: PCT/JP2016/086356
§ 371 (c)(1),
(2) Date: Jun. 8, 2018

(87) PCT Pub. No.: WO2017/099118
PCT Pub. Date: Jun. 15, 2017

(65) Prior Publication Data
US 2019/0003647 A1    Jan. 3, 2019

(30) Foreign Application Priority Data

Dec. 11, 2015 (DE) .......... 10 2015 225 023

(51) Int. Cl.
*F17C 5/06* (2006.01)
*F17C 13/02* (2006.01)

(52) U.S. Cl.
CPC .............. *F17C 5/06* (2013.01); *F17C 13/025* (2013.01); *F17C 13/026* (2013.01);
(Continued)

(58) Field of Classification Search
CPC ........ F17C 5/06; F17C 13/025; F17C 13/026; F17C 2250/043; F17C 2250/0439;
(Continued)

(56) References Cited

U.S. PATENT DOCUMENTS

2003/0146106 A1    8/2003 Mitlitsky
2011/0259469 A1    10/2011 Harty et al.
(Continued)

FOREIGN PATENT DOCUMENTS

JP    2015-169325 A    9/2015
WO    2015/055202 A1    4/2015

OTHER PUBLICATIONS

International Search Report dated Feb. 14, 2017, issued in counterpart application No. PCT/JP2016/086356. (1 page).
(Continued)

*Primary Examiner* — Timothy P. Kelly
(74) *Attorney, Agent, or Firm* — Westerman, Hattori, Daniels & Adrian, LLP

(57) ABSTRACT

A process for filling a gas tank made from a gas tank material with gas is provided, which process comprises the following steps: a) setting (S10) a nominal gas filling rate such that the tank is substantially completely filled within a predetermined filling time from a predetermined initial gas pressure value, b) determining (S20), assuming hot case tank conditions, a maximum mass-averaged gas filling temperature that will be reached at the end of the filling process, when filling the gas tank for the predetermined filling time with the nominal gas filling rate, c) selecting (S30) a target gas filling temperature not greater than the maximum mass-averaged gas filling temperature, d) cooling (S40) the gas to be supplied to the gas tank to the target gas filling temperature, e) starting the supply of gas to the gas tank, f) determining (S50) the actual mass-averaged gas filling temperature of the
(Continued)

gas supplied to the tank, g) estimating (S60) an end-of-fill gas pressure from the actual mass-averaged gas filling temperature assuming cold case tank conditions, and h) terminating (S70) the supply of gas to the gas tank when the actual pressure of the gas tank is equal to the lower of the end-of-fill gas pressure and a maximum final fill pressure.

18 Claims, 7 Drawing Sheets

(52) U.S. Cl.
CPC .............. *F17C 2203/0604* (2013.01); *F17C 2203/0663* (2013.01); *F17C 2221/012* (2013.01); *F17C 2223/0123* (2013.01); *F17C 2223/036* (2013.01); *F17C 2225/0123* (2013.01); *F17C 2225/036* (2013.01); *F17C 2227/0337* (2013.01); *F17C 2227/04* (2013.01); *F17C 2250/043* (2013.01); *F17C 2250/0439* (2013.01); *F17C 2250/0626* (2013.01); *F17C 2250/0636* (2013.01); *F17C 2250/0694* (2013.01); *F17C 2250/075* (2013.01); *F17C 2260/022* (2013.01); *F17C 2260/023* (2013.01); *F17C 2260/025* (2013.01); *F17C 2260/026* (2013.01); *F17C 2265/065* (2013.01); *F17C 2270/0139* (2013.01); *F17C 2270/0168* (2013.01); *F17C 2270/0184* (2013.01)

(58) Field of Classification Search
CPC ........ F17C 2250/0421; F17C 2250/021; F17C 2260/022; F17C 2260/026
See application file for complete search history.

(56) References Cited

U.S. PATENT DOCUMENTS

2012/0227864 A1    9/2012  Mori
2017/0074456 A1*   3/2017  Handa .................. F17C 13/084

OTHER PUBLICATIONS

Extended Search Report dated Jun. 14, 2019, issued in counterpart EP Application No. 16873011.7 (5 pages).

* cited by examiner

PROCESS FOR REFILLING A GAS TANK AND GAS SUPPLY SYSTEM

TECHNICAL FIELD

The present invention relates to a process for refilling a gas tank and a gas supply system, e.g. of a vehicle, with gas, in particular hydrogen.

BACKGROUND ART

When refilling the gas tank of a gas-driven vehicle, the transfer of the compressed gas must be controlled in order to prevent overheating of the tank (e.g. beyond 85° C.) due to insufficient pre-cooling or an excessive filling speed as well as an overpressure (e.g. beyond 87.5 MPa) as a result of excessive hydrogen density due to the application of excessive cooling or of an excessive end-of-fill pressure.

To this end, SAE (Society for Automobile Engineers) standard SAE J2601 establishes a protocol and process limits for hydrogen fueling of light duty vehicles. In particular, SAE J2601 requires that, at each point of time of the fueling process, the fueling process complies with strict limits on the filling temperature and the filling pressure. In FIG. 1 the areas of allowed temperature and pressure are indicated by hatching. For instance, from about 40 seconds on after starting of the fueling process, the temperature must be continuously maintained between −33° C. and −40° C. Due to these strict limits the refilling of a tank to a predetermined hydrogen density of 40.2 kg/m$^3$ may take excessively long, e.g. more than 5 minutes.

CITATION LIST

Patent Literature

[PLT 1] United States Patent Application Publication, Publication No. US 2011/0259469 A1

SUMMARY OF INVENTION

Problems to be Solved by the Invention

In an attempt to provide a solution to this problem, United States Patent Application Publication, Publication No. US 2011/0259469 A1 proposes an analytical method that can be utilized by hydrogen filling stations for calculating the gas filling temperature of the gas filled into the tank. This analytical method is based on a model, which only aims to predict the gas temperature, by calculating for the tank a composite heat capacity value corresponding to heat transferred to the tank, based on a model which requires the fitting of five parameters in function the tanks characteristics. The need to identify five parameters introduces complexity. Moreover, in the filling process, a filling pressure ramp determined for achieving the target end-of-fill pressure must be followed within narrow boundaries, which increases the overall complexity in the filling process even further.

In view of the above, it is the object of the present invention, to provide a process which may be used by a gas refilling station for safely and efficiently refilling the gas tank, e.g. of a vehicle.

Means for Solving the Problems

According to the present invention, this object is solved by a process for filling a gas tank made from a gas tank material with gas, the process comprising the steps:

a) setting a nominal gas filling rate such that the tank is substantially completely filled within a predetermined filling time from a predetermined initial gas pressure value, b) determining, assuming hot case tank conditions, a maximum mass-averaged gas filling temperature that will be reached at the end of the filling process, when filling the gas tank for the predetermined filling time with the nominal gas filling rate, c) selecting a target gas filling temperature not greater than the maximum mass-averaged gas filling temperature, d) cooling the gas to be supplied to the gas tank to the target gas filling temperature, e) starting the supply of gas to the gas tank, f) determining the actual mass-averaged gas filling temperature of the gas supplied to the tank, g) estimating an end-of-fill gas pressure from the actual mass-averaged gas filling temperature assuming cold case tank conditions, and h) terminating the supply of gas to the gas tank when the actual pressure of the gas tank is equal to the lower of the end-of-fill gas pressure and a maximum final fill pressure.

The present invention is based on the fact that the inventors have realized that increasing the filling time is not the most effective way to control temperature increase in the tank, and that the nominal filling rate providing a filling time of 3 minutes when starting from the minimum state of charge (e.g. 0%) can generally be achieved without exceeding the upper wall temperature limit of 85° C.

The process according to the present invention may be used preferably for refueling Type 3 or Type 4 tanks, but may also be applied to other types of tanks, e.g. Type 2 tanks.

Each of the hot case tank conditions, i.e. conditions selected to avoid overheating of the gas tank as a result of the filling process, and the cold case tank conditions, i.e. conditions selected to avoid an excessive state of charge of the gas tank as a result of the filling process, may be specified by an initial temperature of the gas in the tank (below also denoted as "initial gas temperature") and/or an initial temperature of the gas tank material (e.g. liner or wrapping, below also denoted as "initial gas tank temperature") and an initial gas pressure in the gas tank (also denoted as "initial pressure"). For example, it may be assumed that the initial gas and/or gas tank temperature is a predetermined function of the ambient temperature which can be measured by the gas refilling station and/or that the initial gas and/or gas tank temperature is higher than the ambient temperature by a certain value, e.g. 10° C., and/or that the initial pressure has a lowest possible value for a vehicle gas tank to be allowed for a refilling, e.g. 0.5 MPa, and/or that the gas tank is a Type 4 gas tank, i.e. a gas tank made from a gas tank material comprising a plastic liner. Furthermore, it may be assumed as a cold tank condition that the initial gas and/or gas tank temperature has a predetermined lowest value, e.g. −40° C., and/or the initial gas pressure is set to have a value measured in the tank or higher, and/or that the gas tank is a Type 3 gas tank, i.e. a gas tank made from a gas tank material comprising a metal liner and a wrapping for fully wrapping the metal liner. When specifying the hot case conditions and the cold case conditions by making use of values measured, potential measurement accuracies may be taken into account by applying a tolerance to each of the measured values assuming a worst case.

With respect to these conditions, conditions which are beyond the refilling station's control are of particular interest. Whereas an insufficient pre-cooling of the gas and/or excessive cooling of the gas and/or an excessive filling speed may be avoided by the refilling station taking appropriate counter-measures, conditions of the tank to be refueled may only be taken into account by the refilling station if the tank is provided with corresponding sensors and a communication protocol is established between the tank and the refilling station.

On the other hand, if there is no uncertainty with regard to the relevant characteristics of the tank and the initial conditions, e.g. owing to a precise measurement, the initial gas and/or gas tank temperature as well as the initial gas pressure may be fixed as the known values in steps b) and h). In other words, the "hot case conditions" and the "cold case conditions" may be set identically.

The maximum mass-averaged gas filling temperature is a temperature of gas being supplied, which enables the temperature of the gas in the gas tank (also denoted as "gas temperature") or the temperature of the gas tank material temperature (also denoted as "gas tank temperature") not to exceed a predetermined maximum temperature at the end of the filling process, if the gas tank is supplied with the gas with the mass-averaged gas filling temperature "on average" (e.g. constantly) for the predetermined filling time $t_{fill}$ (e.g. for 3 minutes) with the nominal gas filling rate (e.g. 23.2 MPa/min).

When the temperature of the gas being supplied ("filling temperature") varies during the predetermined filling time, a mass-averaged gas filling temperature may be defined as the temperature such that, if the gas would have been supplied with the constant mass-averaged gas filling temperature for the predetermined filling time, the gas so-supplied would have provided the enthalpy identical to the enthalpy provided by the gas actually supplied to the gas tank with varying gas filling temperature. In this sense, the term "mass-averaged" may be understood as "process-averaged". There may be various ways to cool the gas to be supplied to the gas tank such that the gas is supplied as if it was supplied with a mass-averaged gas filling temperature not exceeding the maximum mass-averaged gas filling temperature. For instance, less cooling may be applied to the gas to be supplied at the beginning of the filling process with more cooling applied with the time elapsed, similar to the temperature constraint illustrated in FIG. 1, In contrast to the method according to SAE J2601, however, in the method according to the present invention it is not necessary to apply a constraint similar to that illustrated in FIG. 1.

The maximum mass-averaged gas filling temperature may be determined by requiring the temperature of the gas in the tank or the temperature of the tank material not exceed a predetermined maximum final temperature, e.g. 85° C.

The simplest way to implement a mass-averaged gas filling temperature in the filling process may be assuming a constant filling temperature and accordingly cooling the gas to be supplied so as to maintain a constant filling temperature to be equal to or lower than the maximum mass-averaged gas filling temperature throughout the filling process. The filling temperature may be measured at a point where the gas is dispensed to be supplied to a gas tank. In steps c) and d) of the present invention, a target gas filling temperature not greater than the maximum mass-averaged gas filling temperature may be selected and the gas to be supplied to the gas tank is cooled to the target gas filling temperature. If the gas is supplied with a constant filling temperature, the actual mass-averaged gas filling temperature in step f) may be determined by simply measuring the temperature of the gas being supplied.

The filling process may be terminated (step h)), when the actual gas pressure of the gas tank is equal to the lower of the end-of-fill gas pressure estimated in the step g) and a maximum final fill pressure, preferably predetermined to be, e.g. 87.5 MPa. The maximum final fill pressure may be determined during the filling process as a tank pressure corresponding to a specific state of charge, e.g. 120%. The end-of-fill gas pressure estimated in the step g) from the actual mass averaged gas filling temperature assuming cold case tank conditions may allow the gas tank reach a maximum allowable state of charge, set, for example, to be 107%. As a consequence, the actual filling time which may depend on an initial state of charge may be different from the predetermined filling time which may be also referred to as a nominal filling time.

The maximum mass-averaged gas filling temperature may be determined (in step b)) by means of any known thermal behavior simulation tool which allows to predict temperature increase of gas in the tank and/or gas tank material in a refilling process by iterations (step ba)). The simulation tool may comprise a numerical model calculating the temperature of the gas together with the transient heat conduction into the wall of the gas tank vessel, assuming homogeneous temperature of the gas and unidirectional heat transfer in the wall, e.g. composed of two layers of the liner and the wrapping in composite material. A look-up table may be prepared in advance providing the maximum mass-averaged gas filling temperature for each possible ambient temperature and each possible value of initial gas pressure in the tank (step bb)), so that gas may be supplied to the gas tank with a suitable mass-averaged gas filling temperature, e.g. chosen by the gas refilling station making use of the look-up table.

Alternatively or additionally, the maximum mass-averaged gas filling temperature can be determined (in step b)) on the basis of an analytical model including adiabatic boundary conditions at the transition from the gas volume of the gas tank to the gas tank material. In particular, on the basis of the model, a relation between enthalpy of the gas supplied to the tank for a specific filling time with a specific filling rate and a temperature increase of the gas and/or gas tank material due to the gas supplied and thus a temperature of the gas and/or of the gas tank material at the end of the filling process may be determined assuming the hot case tank conditions (step bc)); and using the relation determined, the maximum mass-averaged gas filling temperature may be determined from a predetermined maximum allowable temperature of the gas or the gas tank material at the end of the filling process assuming the hot case tank conditions (step bd)).

The relation may be defined in terms of tank characteristics which may include at least one of a tank volume, a length-to-diameter ratio, a thermal effusivity and/or capacity of the tank material (e.g. the thermal effusivity of the plastic liner for a Type 4 tank or the thermal effusivity of the composite material and/or the heat capacity of the metal liner for a Type 3 tank), a thermal capacity of tank piping, and a pressure drop down-stream of the point where the filling temperature is measured. As the maximum mass-averaged gas filling temperature is determined on the basis of an analytical model which does not depend on the initial conditions such as hot case conditions or the cold case conditions, the method for determining the maximum mass-averaged gas filling temperature may be not only applicable in a wide range of situations but also unaffected when the definition of the hot case conditions or the cold case conditions is changed.

Preferably, on the basis of an/the analytical model including adiabatic boundary conditions at the transition from the gas volume of the gas tank to the gas tank material, a relation between temperature increase of the gas in the tank under the adiabatic boundary conditions and temperature increase of the tank material and/or of the gas in the tank without the adiabatic boundary conditions (i.e. under the heat transfer carried out between the gas and the gas tank) may be determined for the hot case tank conditions (step be)). Then, the maximum mass-averaged gas filling temperature may be determined from a/the predetermined maximum allowable temperature of the gas in the tank or the gas tank material at the end of the filling process, assuming the hot case tank conditions and using the relation determined in the step be) (step bf)).

The temperature increase of gas in the tank due to the gas supplied to the tank under the adiabatic boundary conditions, i.e. no heat transfer between the gas volume of the gas tank to the gas tank material, may be obtained easily by applying the first law of thermodynamics. Thus, by using the relation determined between a temperature increase of gas in the tank under the adiabatic boundary conditions and a temperature increase of the tank material, the temperature increase of the tank material may be obtained.

The temperature increase of the tank material may be used for controlling the fueling process, in particular for determining the maximum mass-averaged gas filling temperature in the filling process. Thus, the predetermined maximum final temperature to prevent the overheating of the gas tank may be applied directly to the tank material instead of being applied to the gas.

In contrast, in the conventional methods, the cooling is applied to the extent that the gas temperature at the end of filling process, computed on the basis of the temperature increase of the gas during the filling process for the hot case, will not exceed the allowable maximum temperature of the tank to prevent the overheating. This is due to the fact that up to now it has been considered difficult to compute the temperature increase of the gas tank material.

However, as the temperature of the gas is in general higher than that of the tank material (e.g. higher about by 10° C. during the fast filling process), considering only the gas temperature for determining the filling speed or pre-cooling requirements is overly conservative, i.e. unnecessary overcooling may be applied, when the temperature limit for preventing the overheating of the gas tank is applied to the gas temperature in place of the gas tank material temperature. Thus, predicting the gas tank material temperature may be essential for further optimizing the filling conditions.

FIG. 2 illustrates the maximum mass-averaged gas filling temperature ("Filling temp (° C.)") with respect to initial gas tank temperature ("Hot Soak temp (° C.)"), which enables the gas (here hydrogen) and the gas tank material (here the liner material for a tank of Type 4) not to exceed 85° C. at the end of the filling process (denoted as "Tlim/gas" and "Tlim/liner", respectively). The maximum mass-averaged gas filling temperature is obtained using a thermal behavior simulation tool which allows to predict the temperature increase of the gas and/or gas tank material by iterations to the Type 4 tank specified by a vessel with the volume of 100l, the nominal working pressure of 70 MPa, the length-to-diameter ratio of 2, liner thermal effusivity of 829 $Ws^{1/2} K^{-1} m^{-2}$, gas to liner wall heat transfer coefficient of 250 $WK^{-1} m^{-2}$, the piping thermal capacity of 8.2 kJ/° C. and the mass-averaged pressure drop of 5 MPa. The initial gas pressure of the tank of 0.5 MPa and the filling time of 90 seconds are applied.

FIG. 2 shows that, if the temperature constraint of 85° C. is applied to the tank material, the tank can be filled with a filling temperature higher than −40° C., even when the initial gas tank temperature is as high as 50° C. (which may be the case with a high ambient temperature). Accordingly, less cooling may be used while preventing the overheating of the tank.

In a preferred embodiment, the following steps may be further applied for determining the maximum mass-averaged gas filling temperature in step b):

bg) determining a maximum allowable gas temperature under the adiabatic boundary conditions from a maximum allowable temperature increase of the tank material which is obtainable assuming the hot case conditions from the predetermined maximum allowable temperature of the tank material at the end of the filling process when filling the gas tank for the predetermined filling time with the nominal gas filling rate;

bh) determining an initial specific internal energy of the gas in the tank for the hot case tank conditions;

bi) determining, assuming that the tank is filled to a predetermined state of charge, preferably of 100% under the adiabatic boundary conditions, a maximum specific internal energy of the gas for the determined maximum allowable gas temperature under the adiabatic boundary conditions;

bj) determining, by applying the first law of thermodynamics, a maximum specific enthalpy of the gas to be added to the tank such that the specific internal energy of the gas at the end of filling does not exceed the maximum specific internal energy of the gas; and bk) determining the maximum mass-averaged gas filling temperature on the basis of the maximum specific enthalpy.

The relation between a gas temperature increase in the tank under the adiabatic boundary conditions and a temperature increase of the gas or the gas tank material may be defined by the following equation:

[Math. 1]

$$\Delta T_J / \Delta T_A = a_J P_i + b_J \quad (1)$$

Where $\Delta T_A$ is a temperature increase of the gas in the gas tank under the adiabatic boundary conditions, $\Delta T_J$ is a temperature increase of the gas in the tank or a temperature increase of the gas tank material without the adiabatic boundary conditions (i.e. under the heat transfer carried out between the gas and the gas tank) with J denoting gas or gas tank material, $a_J$ and $b_J$ are fixed parameters specific to tank characteristics and a predetermined filling time, and $P_i$ is an initial gas pressure in the gas tank.

The relation may be applicable in particular to Type 3 or Type 4 tanks, i.e. J may indicate either gas ("G", for a Type 3 or 4 tank), liner ("L", for a Type 3 or 4 tank) or wrapping ("W", for a Type 3 tank). The fixed parameters $a_J$ and $b_J$ may be substantially functions of tank characteristics and a predetermined filling time alone. The tank characteristics may comprise a heat transfer coefficient of the gas to the gas tank material (e.g. the liner and/or the tank material effusivity) and/or a volume to internal area ratio, i.e. substantially independent of the initial gas and/or gas tank temperature as well as of the gas filling temperature. Accordingly, not only may Equation (1) provide a particularly simple way to predict the temperature increase of the gas and/or gas tank material, but also Equation (1) may be applied for any standardized tank, once the parameters valid for the standardized tank are determined, e.g. on the basis of experimental data.

FIG. 3 shows the dependency of a ratio of the temperature increase of the gas in the tank or the gas tank material to the temperature increase of the gas in the gas tank under the adiabatic boundary conditions, e.g. the left-hand side of Equation (1) ($\Delta T_L/\Delta T_A$ denoted as "DTlin/DTa" and $\Delta T_G/\Delta T_A$ denoted as "DT/DTa") on the gas filling temperature (FIG. 3A) on the initial gas tank temperature (FIG. 3B) assumed to be identical to the initial gas temperature, and on the initial gas pressure in the tank (FIG. 3C), for a Type 4 tank specified by a vessel with the volume of 100l, a nominal working pressure of 70 MPa, the vessel length-to-diameter ratio of 2, a liner thermal effusivity of 829 $Ws^{1/2}$ $K^{-1}$ $m^{-2}$, a gas to liner wall heat transfer coefficient of 250 $Wm^{-2}K^{-1}$ and the filling time of 180 seconds.

As can be seen from the FIGS. 3A and 3B, the dependency of the ratio of the temperature increases on the gas filling temperature as well as on the initial gas and/or gas tank temperature is small enough to be neglected when defining the relationship between the gas temperature under the adiabatic condition and the gas or the gas tank material temperature, which relationship is to be used to compute the temperature increase of the gas tank material or the gas in the filling process. Further, the FIG. 3C shows that the ratio of the temperature increases is indeed a linear function of the initial gas pressure in the tank.

The Equation (1) may be obtained as follows: First, assuming a uniform gas temperature for the gas in the tank, a uniform tank material temperature, a constant heat transfer coefficient from the gas to the tank material and no heat loss to surroundings, and modeling the tank material as a semi-infinite solid, the temperature increase of the tank material for a given temperature of the gas in the tank (before the heat transfer from the gas to the tank material takes place, i.e. the temperature of the gas is the gas temperature under the adiabatic boundary conditions) may be computed using a function analytically obtained in thermodynamics, which describes temperature elevation for a semi-infinite solid exposed to convection. The tank material may be a plastic liner (e.g. in case of a Type 4 tank) or a wrapping (e.g. in case of a Type 3 tank).

The modelling of the tank material as a semi-infinite solid is valid, as the filling process according to the present invention may be completed sufficiently quickly (i.e. within a few minutes), so that a non-metallic material thermally interacting with the gas (e.g. plastic liner in direct thermal contact with the gas in the Type 4 gas tank and the wrapping in indirect thermal contact with the gas in the Type 3 gas tank) can be assumed to have an infinite thickness for predicting the amount of heat exchanged between the gas and the vessel wall of the tank during the filling process. The linear relation implemented by the Equation (1) may allow, in turn, a quick filling of the gas tank by enabling application of a less stringent constraint on the filling gas temperature, which is not only quicker than the conventional filling process as explained with regard to FIG. 1 but also sufficiently quick for the linear relation to be valid.

Since the gas temperature in the tank may vary during the filling process, the temperature increase of the tank material for a variable gas temperature may be needed. This may be obtained by numerical computation, e.g. by applying Duhamel superposition theorem on the temperature increase of the tank material for a given gas temperature. The temperature increase of the gas in the tank after the heat transfer between the gas and the tank material may then be determined by again applying the first law of thermodynamics.

The fixed parameters $a_J$ and $b_J$ may be determined, for example, by linear regression using data available to the public, on the initial gas pressure of the gas tank and the temperature profile of the gas tank material during a filling process. Alternatively, the linear regression may be applied to the temperature predictions made using a known thermal behavior simulation tool which allows to predict the temperature increase of the gas in the tank and/or of the gas tank material.

To determine the maximum mass-averaged gas filling temperature on the basis of the maximum specific enthalpy of the gas to be added to the tank, a linear approximation of the specific enthalpy of the gas in function of temperature and pressure may be used. Here, an average pressure drop in the piping downstream of a point where the filling temperature and pressure is measured as well as the thermal capacity of the piping downstream resulting in a certain amount of the energy input into the gas may be taken into account for a better precision.

Alternatively to the Equation (1), a relationship between the temperature increase ($\Delta T_J$) of gas in the tank or of the gas tank material and the temperature increase ($\Delta T_A$) of the gas in the gas tank under the adiabatic boundary conditions may be defined by the following equation:

[Math. 2]

$$\Delta T_J/\Delta T_A = [(aa_1/\varphi_3 + ba_1)\log(\varphi_1/c_1\varphi_3) + (aa_0/\varphi_3 + ba_0)] \Big/ (\varphi_2/c_1\varphi_3)^{0.5} + [(ab_1/\varphi_3 + bb_1)\log(\varphi_1/c_1\varphi_3) + (ab_0/\varphi_3 + bb_0)] \quad (2)$$

where $\Delta T_A$ is a temperature increase of the gas in the gas tank under the adiabatic boundary conditions, $\Delta T_J$ is a temperature increase of the gas in the tank or a temperature increase of the gas tank material without the adiabatic boundary conditions (i.e. under the heat transfer carried out between the gas and the gas tank) with J denoting gas or gas tank material, $\varphi_1$, $\varphi_2$ and $\varphi_3$ are parameters defined as $\varphi_1 = \varepsilon v T_f^{0.5}/P_i$, $\varphi_2 = h v T_f/P_i$, $\varphi_3 = P_n/P_i$ with $T_f$ denoting a gas filling temperature, $P_i$ an initial pressure, h a gas-to-tank material (e.g. liner) heat transfer coefficient (which may be assumed to be constant), $t_f$ a predetermined filling time (nominal filling time), $P_n$ a nominal fill pressure, $\varepsilon$ a tank material (e.g. liner) effusivity and v a tank vessel volume to internal area ratio, and $aa_1$, $ba_1$, $aa_0$, $ba_0$, $ab_1$, $bb_1$, $ab_0$, $bb_0$, and $c_1$ are constants. The Equation (2) may be considered to be a generalized relation of the Equation (1).

For a Type 4 gas tank, the constants $aa_1$, $ba_1$, $aa_0$, $ba_0$, $ab_1$, $bb_1$, $ab_0$, $bb_0$, and $c_1$ may be determined as follows:

TABLE 1

|     | $T_g/T_a$ | $T_f/T_a$ |
| --- | --- | --- |
| aa1 | 4.47E−02 | −5.68E−01 |
| ba1 | 1.06E+00 | −2.39E+00 |
| aa0 | −1.80E−01 | −7.45E+00 |
| ba0 | −7.18E−01 | −8.35E−02 |
| ab1 | 1.60E−01 | −2.45E−01 |
| bb1 | −4.28E−01 | −4.15E−01 |
| ab0 | 8.57E−02 | 9.30E−01 |
| bb0 | 1.21E+00 | 1.82E+00 |
| c1  | 4.38E−02 | 2.74E−03 |

A similar generalization can be found for a Type 3 gas tank.

For a range of filling conditions (e.g. a vessel volume, V, of 20l to 500l; a vessel length-to-diameter L/D from 1 to 10; a nominal filling pressure $P_n$ up to 100 MPa; a predetermined filling time, $t_f$, of 90 s to 300 s; an effusivity, $\varepsilon$, of 250 to 2500 W $s^{1/2}K^{-1}$ $m^{-2}$, a heat transfer coefficient, h, of 50 to 1000 Wm$^{-2}$K$^{-1}$), the dependency on the gas filling temperature in the Equation (2) is observed to be small enough to be neglected for the purpose of the relation, as shown by FIG. 3A.

The Equation (2) may be used to determine the fixed parameters $a_J$ and $b_J$ of the Equation (1), considering the hot case and cold case conditions defined, and assuming a specific (e.g. mid-range) value for the filling temperature, e.g. −10° C. The determination of $a_J$ and $b_J$ may be also independent of the initial pressure $P_i$, due to the form of Equation (2) as well as of initial gas tank temperature $T_i$. Therefore, the ratio of the gas temperature increase under the adiabatic boundary conditions to the gas or gas tank material temperature increase may be expressed as a linear function of initial pressure $P_i$ with the fixed parameters $a_J$ and $b_J$ that are substantially independent of the initial gas and/or gas tank temperature, initial pressure as well as the filling temperature.

Thus, the Equation (2) may provide a standardized way of defining upfront the filling requirements for any category of vehicle gas tanks, based on any selected hot case and cold case condition.

In one embodiment, the step f) further comprises:

fa) measuring the actual temperature of the gas supplied to the tank, fb) estimating an actual mass-averaged gas filling temperature (MAT(t)) on the basis of the amount of gas supplied to the gas tank in each time interval since the start of the supply of gas to the gas tank and the respectively measured temperature of the gas supplied.

In case the gas is supplied with a variable filling temperature, the actual mass-averaged gas filling temperature may be estimated, as if the gas was supplied with the constant actual mass-averaged gas filling temperature.

In one embodiment, the end-of-fill-pressure in step g) may be determined by means of any known thermal behavior simulation tool which allows to predict the temperature increase of the gas in the tank and/or of the gas tank material by iterations (step ga)). The simulation tool may comprise a numerical model calculating the temperature of the gas together with the transient heat conduction into the wall of the gas tank vessel, assuming homogeneous temperature of the gas and unidirectional heat transfer in the wall, e.g. composed of two layers of the liner and the wrapping in composite material. A look-up table may be prepared in advance providing the end-of-fill pressure for each possible value of applied mass-averaged gas filling temperatures and for each possible value of initial gas pressure of the gas tank (step gb)) such that, to terminate the supply of the gas, the gas filling process may apply the end-of-fill-pressure chosen from the look-up table for a given tank type, the applied mass-averaged gas filling temperature and the initial gas pressure in the tank measured.

Alternatively or additionally, the end-of-fill-pressure may be determined in step g) by the following steps:

gc) determining, on the basis of an/the analytical model including adiabatic boundary conditions at the transition from the gas volume of the gas tank to the gas tank material, a relation between temperature increase of the gas in the tank under the adiabatic boundary conditions and temperature increase of the tank material and/or of the gas in the gas tank (without the adiabatic boundary conditions, i.e. under the heat transfer carried out between the gas and the gas tank);

gd) estimating, assuming that the mass-averaged gas filling temperature at the end of filling process is the actual mass-averaged gas temperature at the end of filling process and by applying the first law of thermodynamics, the end-of-fill-pressure based on the relation determined in the step gc) such that a predetermined state of charge in the gas tank is achieved at the end of filling process.

The predetermined state of charge may be, for example, 107% which enables the tank pressure at the end of filling process not to exceed 87.5 MPa for a Type 3 or Type 4 tank, assuming that the tank material temperature is raised up to the maximum ambient temperature assumed to be 50° C.

Preferably, the relation in the step gc) between the temperature increase of the gas in the tank under the adiabatic boundary conditions and the temperature increase of the gas tank material or the gas is defined by the following equation:

[Math. 3]

$$\Delta T_J / \Delta T_A = a_J P_i + b_J, \qquad (3)$$

where $\Delta T_A$ is a temperature increase of the gas in the tank under the adiabatic boundary conditions, $\Delta T_J$ is temperature increase of the gas or the gas tank material without the adiabatic boundary conditions (i.e. under the heat transfer carried out between the gas and the gas tank) with J denoting gas or gas tank material, $a_J$ and $b_J$ are fixed parameters specific to tank characteristics and the predetermined filling time, and $P_i$ is an initial gas pressure of the gas tank.

Again, the temperature increase of gas in the tank due to the gas supplied to the tank under the adiabatic boundary conditions, i.e. no heat transfer between the gas volume of the gas tank to the gas tank material, may be obtained easily by applying the first law of thermodynamics, which renders the relation particularly useful.

The relation may be applicable in particular to Type 3 or Type 4 tanks, i.e. J may indicate either gas ("G", for a Type 3 or 4 tank), liner ("L", for a Type 3 or 4 tank) or wrapping ("W", for a Type 3 tank). The fixed parameters $a_J$ and $b_J$ may be substantially functions of tank characteristics and a predetermined filling time alone as can be seen from FIG. 3. The tank characteristics may comprise a heat transfer coefficient of the gas to the gas tank material (e.g. the liner and/or the tank material effusivity) and/or a volume to internal area ratio, i.e. substantially independent of the initial gas temperature in the gas tank as well as of the gas filling temperature. Accordingly, not only may Equation (3) provide a particularly simple way to predict the temperature increase of the gas/gas tank material, but also Equation (3) may be applied for any standardized tank, once the parameters are determined. Equation (3) may be obtained in a similar way to that presented above with regard to Equation (1).

In the step gd), the end-of-fill pressure may be estimated by assuming a constant gas filling temperature (e.g. the target gas filling temperature) and taking the temperature increase of the gas in the gas tank resulting from the supply of gas to the gas tank into account.

Alternatively, a relationship between the temperature increase ($\Delta T_J$) of the gas in the tank or of the gas tank material and the temperature increase ($\Delta T_A$) of the gas in the gas tank assuming the adiabatic boundary conditions may be defined by the following equation:

[Math. 4]

$$\Delta T_J / \Delta T_A = [(aa_1/\varphi_3 + ba_1)\log(\varphi_1/c_1\varphi_3) + (aa_0/\varphi_3 + ba_0)] \Big/ \qquad (4)$$
$$(\varphi_2/c_1\varphi_3)^{0.5} + [(ab_1/\varphi_3 + bb_1)\log(\varphi_1/c_1\varphi_3) + (ab_0/\varphi_3 + bb_0)]$$

where $\Delta T_A$ is a temperature increase of the gas in the gas tank under the adiabatic boundary conditions, $\Delta T_J$ is a temperature increase of the gas in the tank or a temperature increase of the gas tank material without the adiabatic boundary conditions (i.e. under the heat transfer carried out between the gas and the gas tank) with denoting gas or gas tank material, where $\varphi_1$, $\varphi_2$ and $\varphi_3$ are parameters defined as $\varphi_1 = \varepsilon v T_f t_f^{0.5}/P_i$, $\varphi_2 = hv T_f t_f/P_i$, $\varphi_3 = P_n/P_i$, with $T_f$ denoting a gas filling temperature (nominal filling time), $P_i$ an initial tank pressure, h a gas-to-tank material (e.g. liner) heat transfer coefficient (which may be assumed constant), $t_f$ a predetermined filling time, $P_n$ a nominal fill pressure, $\varepsilon$ a tank material (e.g. liner) effusivity and v a vessel volume to internal area ratio, and $aa_1$, $ba_1$, $aa_0$, $ba_0$, $ab_1$, $bb_1$, $ab_0$, $bb_0$, and $c_1$ are constants. For a Type 4 gas tank, the values may be determined as follows:

TABLE 2

|     | $T_g/T_a$ | $T_l/T_a$ |
| --- | --- | --- |
| aa1 | 4.47E−02 | −5.68E−01 |
| ba1 | 1.06E+00 | −2.39E+00 |
| aa0 | −1.80E−01 | −7.45E+00 |
| ba0 | −7.18E−01 | −8.35E−02 |
| ab1 | 1.60E−01 | −2.45E−01 |
| bb1 | −4.28E−01 | −4.15E−01 |
| ab0 | 8.57E−02 | 9.30E−01 |
| bb0 | 1.21E+00 | 1.82E+00 |
| C1  | 4.38E−02 | 2.74E−03 |

A similar generalization can be found for a Type 3 gas tank.

Additionally or alternatively, the step g) may further comprise determining whether information transmitted from the gas tank to be filled is available and, if the information is available, determining a state of charge in the gas tank to be achieved at the end of filling process based on the information, and determining the end-of-fill-pressure and/or the maximum final fill temperature further based on the state of charge determined.

When information from the gas tank, for example including the real-time value of the gas pressure of the gas tank and/or the gas volume temperature is available, the decision to terminate the supply of the gas to the gas tank may be made on the basis of that information when values corresponding to a state of change of 100% are reached. In this case, a maximum allowable value for the state of charge determined without the information from the tank, e.g. 120% may be defined as a safety measure for ensuring termination of the process even if the information transmitted from the gas tank is erroneous.

According to another aspect, the present invention relates to a gas supply system adapted to carry out the process presented above. Such a gas supply system may be provided in a gas refilling station. Further, the gas supply system or the gas refilling station may be provided with sensors such as a temperature sensor to measure the ambient temperature and/or the gas filling temperature, e.g. at a dispenser and/or the gas temperature in a tank, or a pressure sensor to measure the gas pressure in a tank.

In a preferred embodiment, the gas supply system is adapted to carry out at least one of the steps a), b), c), f) and g) just prior to the step d), which may allow the gas supply system or the gas refilling station be readily configured for the type of gas tanks or the type of vehicles to be fueled.

In the following, an embodiment of the present invention will be explained in more detail referring to the accompanying drawings.

DESCRIPTION OF EMBODIMENTS

Figure 1:
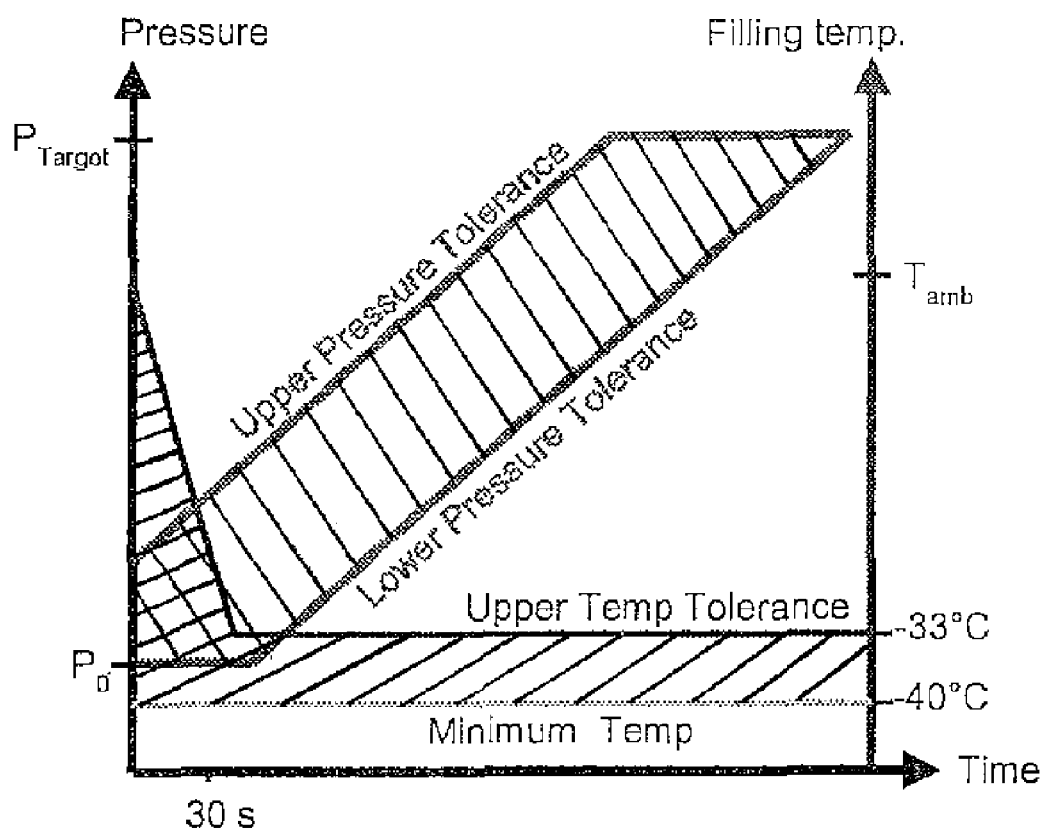
FIG. 1 shows the strict limits required in the standard protocol on the filling temperature and the filling pressure.
Figure 2:
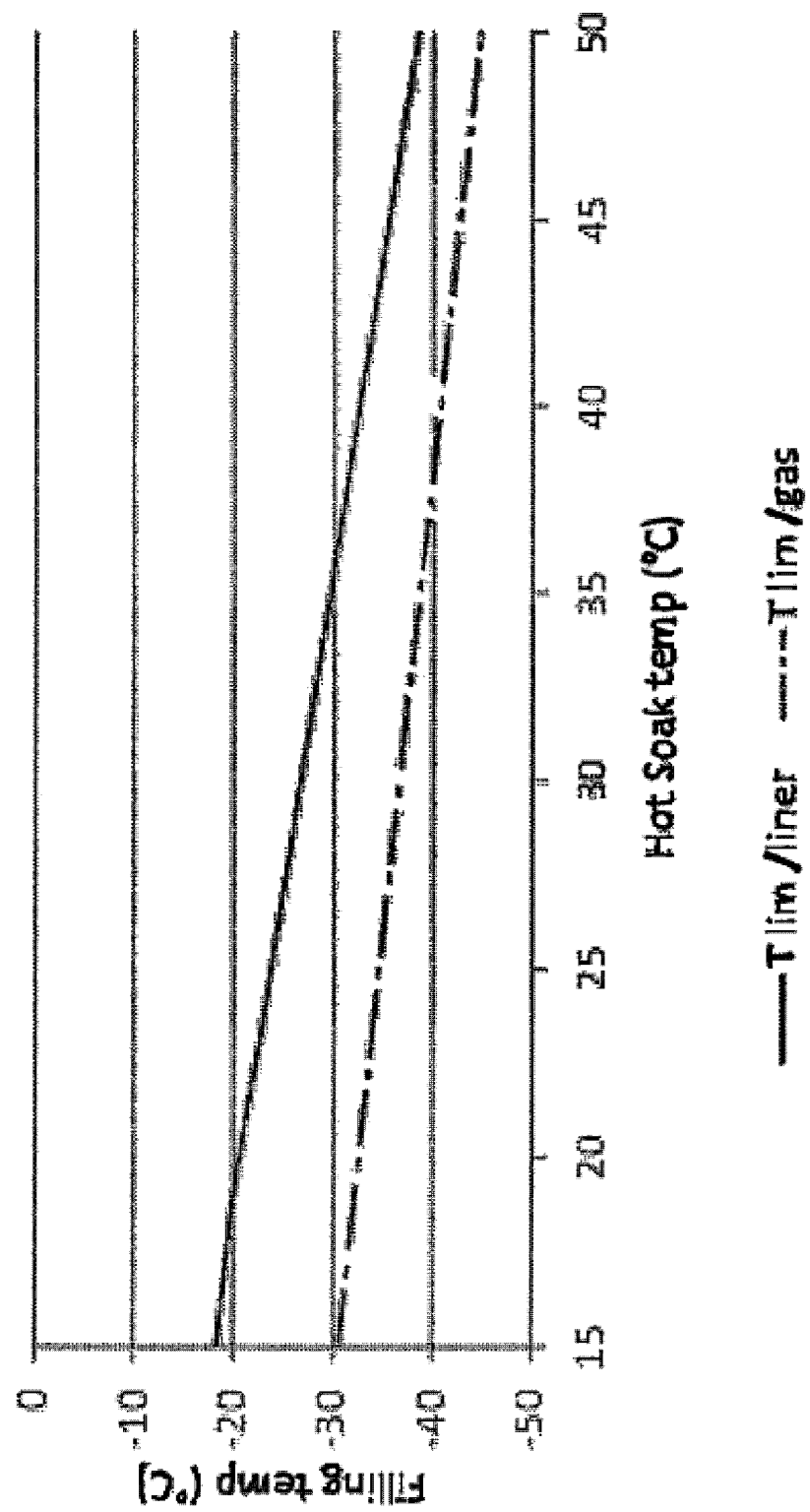
FIG. 2 illustrates, for a given initial gas tank temperature, the maximum mass-averaged gas filling temperature which enables the temperature of the gas in the tank and of the liner material of the gas tank not to exceed 85° C. at the end of the filling process for a Type 4 hydrogen gas tank with the initial gas pressure of the gas in the tank being 0.5 MPa and the tank being filled for 90 seconds.
Figure 3A:
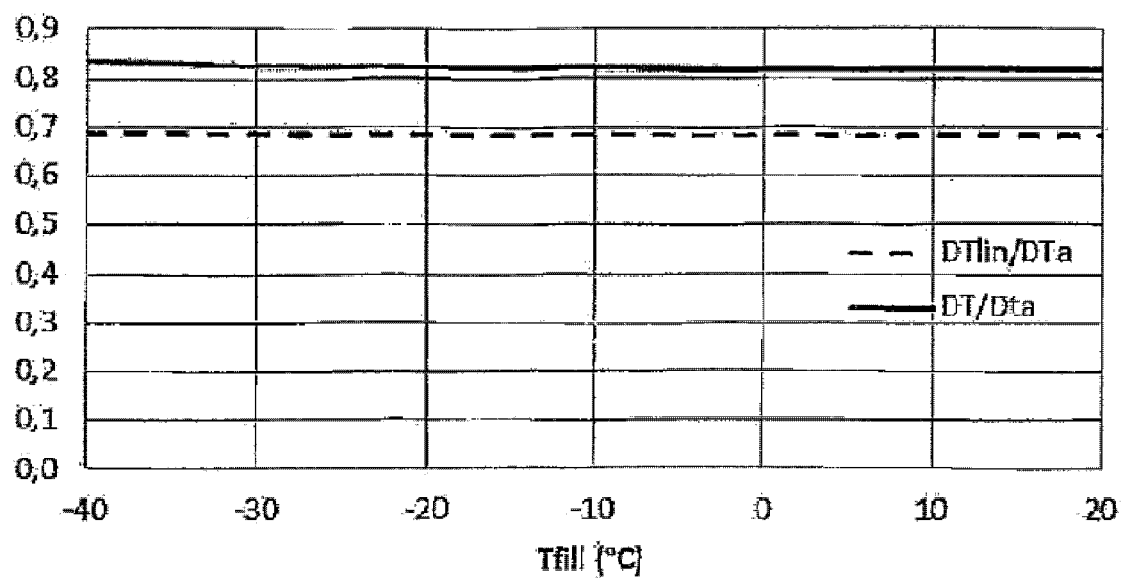
FIG. 3A illustrates the dependency of the ratio between gas temperature increase under the adiabatic conditions and temperature increase of the gas or the gas tank material on the gas filling temperature.
Figure 3B:
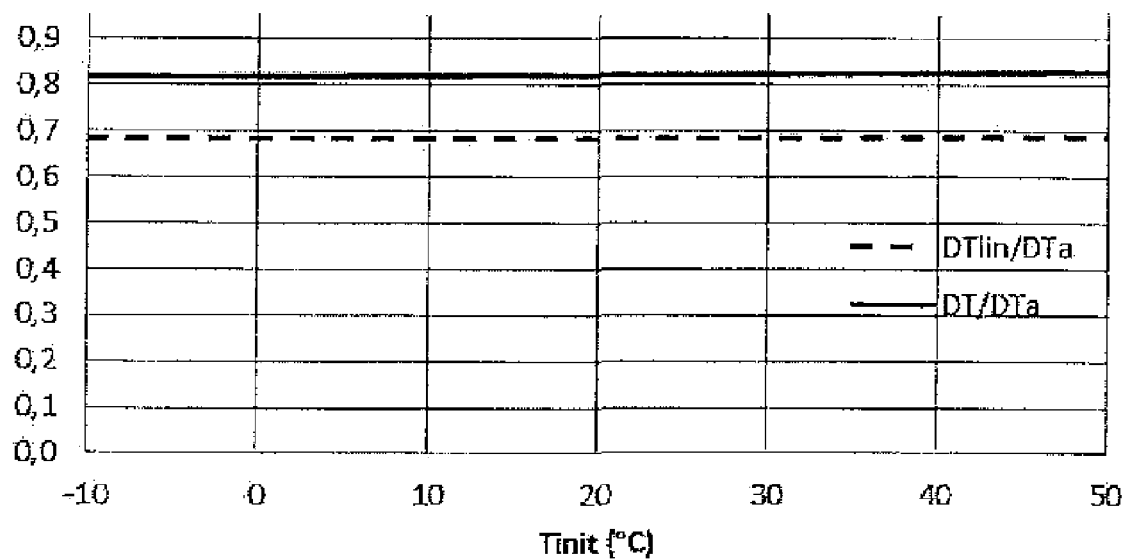
FIG. 3B illustrates the dependency of the ratio between gas temperature increase under the adiabatic conditions and temperature increase of the gas or the gas tank material on the initial gas tank temperature.
Figure 3C:
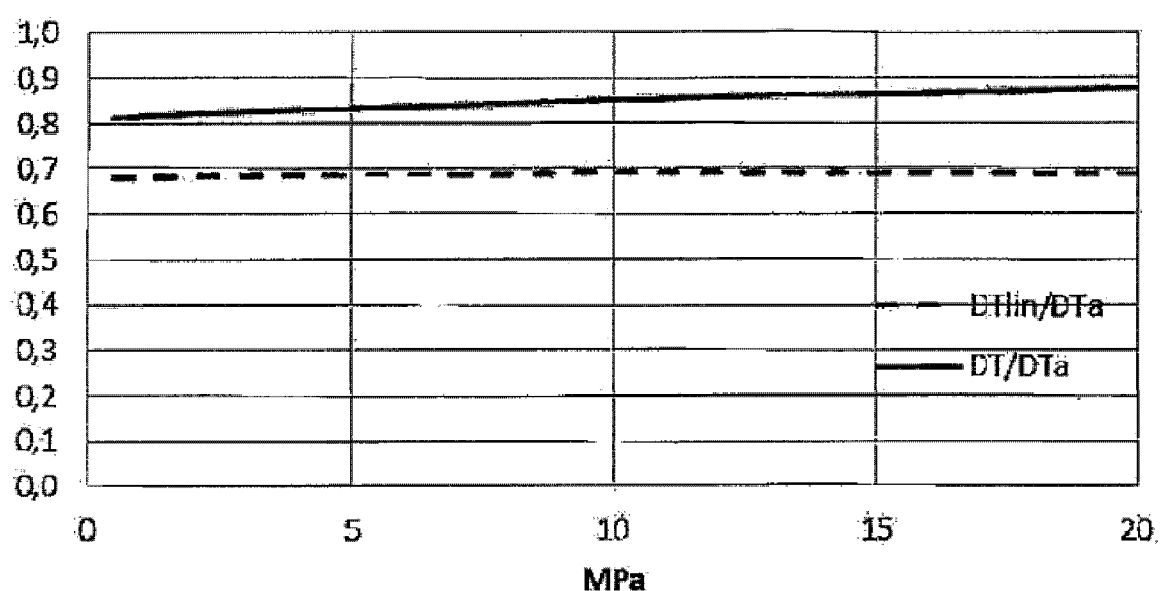
FIG. 3C illustrates the dependency of the ratio between gas temperature increase under the adiabatic conditions and temperature increase of the gas or the gas tank material on the initial gas pressure in the tank.
Figure 4:
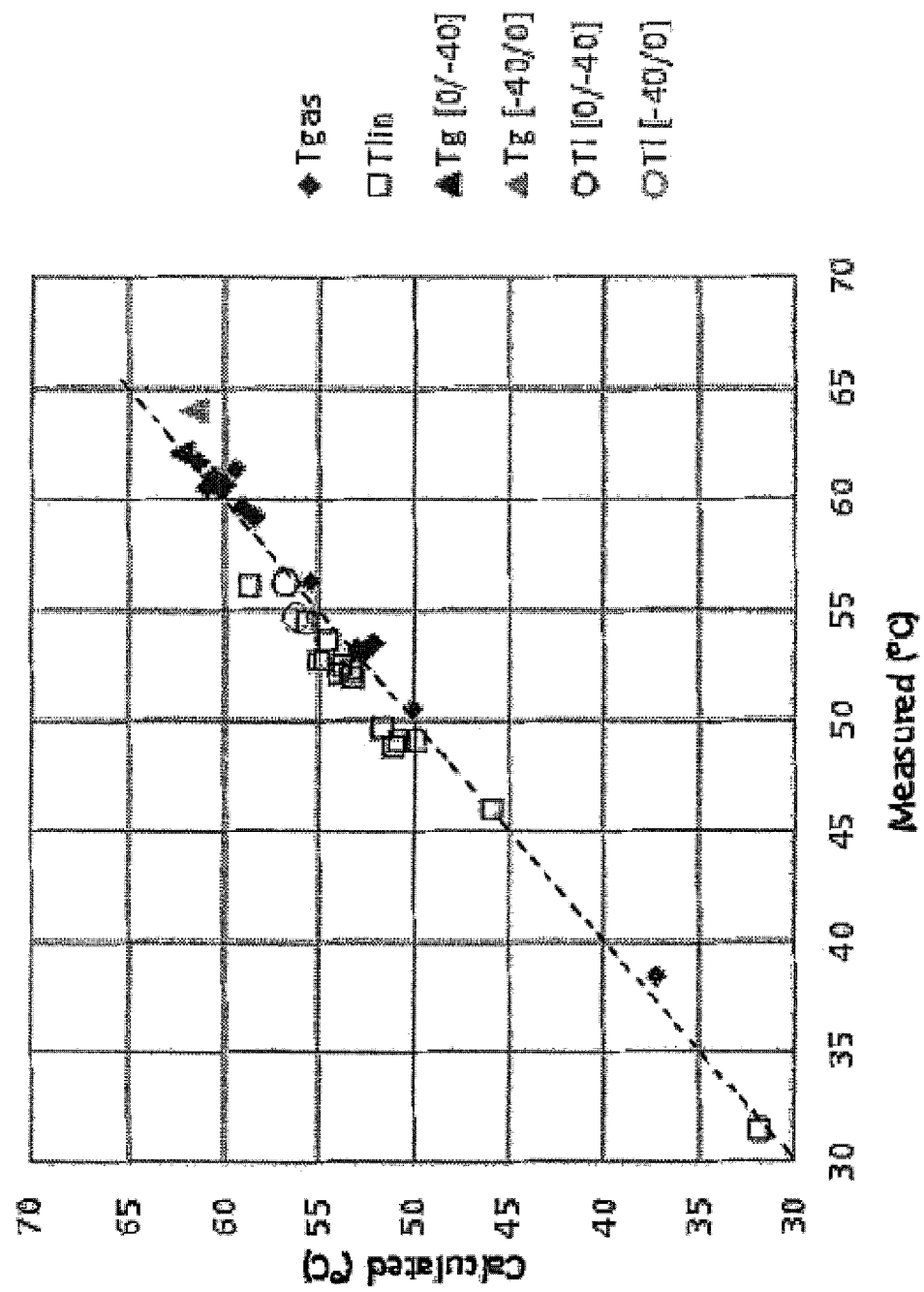
FIG. 4 shows exemplarily an experimental validation of a model according to an embodiment of the present invention by comparing gas/liner temperature at the end of a filling process computed using the model and actually measured for a Type 3 hydrogen gas tank.

FIG. 4 exemplarily shows an experimental validation of a model according to an embodiment of the present invention.

In FIG. 4, the temperature of the gas and of the gas tank material (i.e. liner) at the completion of filling processes, i.e. when the predetermined filling time of 3 minutes ended for a Type 3 hydrogen tank having volume of 40l, actually measured and calculated using a model according to an embodiment of the present invention are demonstrated for various initial gas tank temperature (i.e. various ambient temperature) and for three different gas filling temperature profiles, namely, filling with hydrogen having a constant filling temperature of −20° C. which is denoted with "Tgas" for the gas temperature and "Tlin" for the liner temperature; filling with hydrogen having a temperature of 0° C. for the first 1.5 minutes and then with hydrogen having a temperature of −40° C. for the next 1.5 minutes, denoted with "Tg[0/−40]" for the gas temperature and "Tl[0/−40]" for the liner temperature; filling with hydrogen having a temperature of −40° C. for the first 1.5 minutes and then with hydrogen having a temperature of 0° C. for the next 1.5 minutes, denoted with "Tg[−40/0]" for the gas temperature and "Tl[−40/0]" for the liner temperature. In the calculation to obtain the gas or the liner temperature, the average filling temperature is used as a constant mass average gas filling temperature for the sake of simplicity, and Equations (1) and (3) above are applied with the fixed parameters $a_J$ and $b_J$ being determined by linear regression using data available to the public.

As can be seen from FIG. 4, the calculated temperature agrees with the measured temperature sufficiently well. This provides not only the confirmation to the applicability of the model, but also to the observation that for a given tank design and given initial conditions, only the average filling temperature (i.e. the enthalpy input) needs to be controlled to prevent a predetermined maximum allowable gas or gas tank material temperature from being exceeded, but not the temperature profile throughout the filling process.

Figure 5:
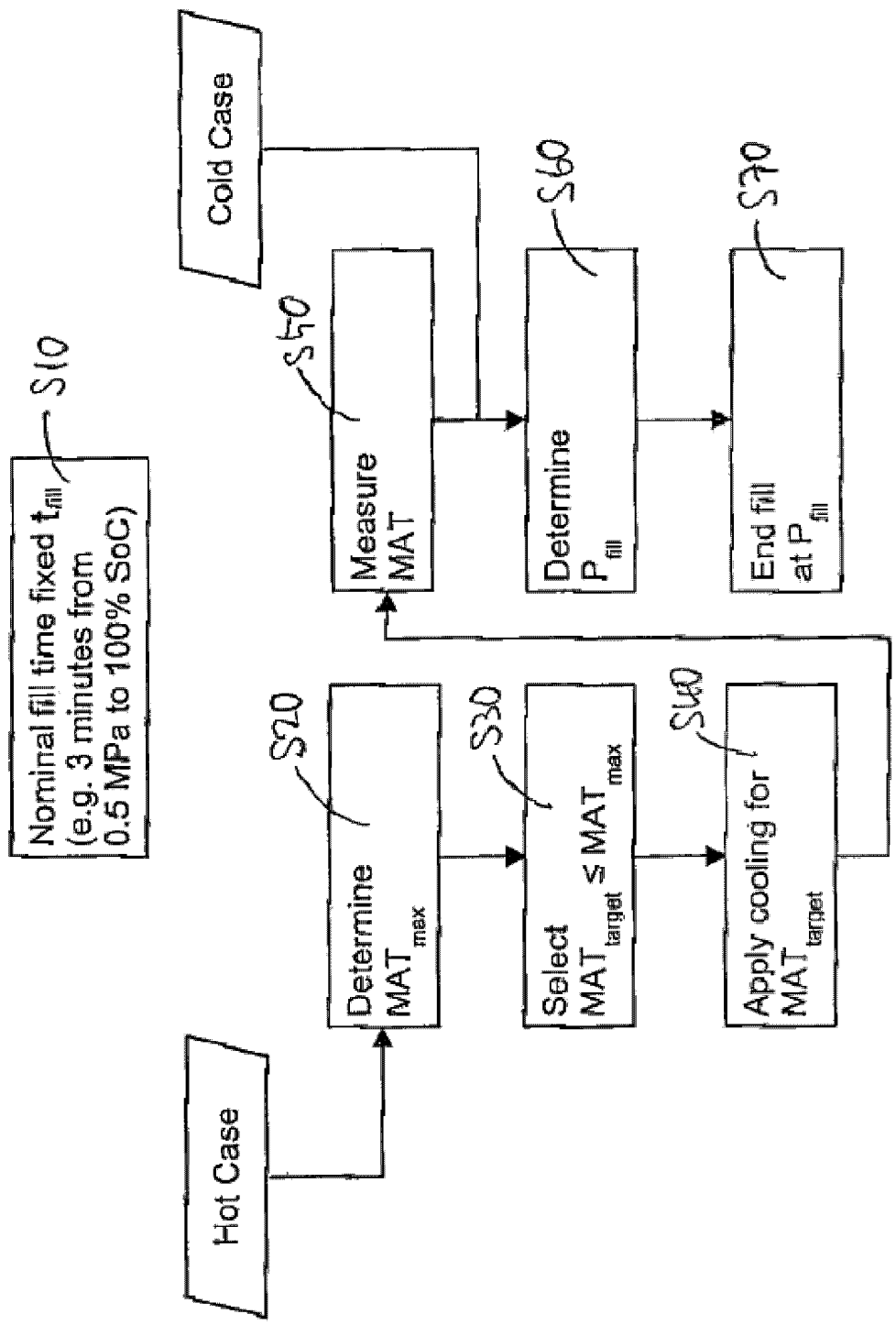
FIG. 5 shows a block diagram of an embodiment of the process for filling a gas tank according to the present invention. For the sake of simplicity, the embodiment is explained with an example of a hydrogen gas tank of Type 4.

FIG. 5 shows a block diagram of an embodiment of the process for filling a gas tank according to the present invention. For the sake of simplicity, the embodiment is explained with an example of a hydrogen gas tank of Type 4. The embodiment is applicable to other gas to be filled in a gas tank as well as other types of gas tank such as Type 2 or Type 3.

According to FIG. 5, the process starts with fixing a nominal filling rate which may be applied to any gas filling process (step S10).

The nominal filling rate may be determined as the filling rate which provides the tank being substantially completely filled within a predetermined filling time $t_{fill}$, e.g. 3 minutes from a predetermined initial gas pressure value, e.g. 0.5 MPa.

In step S20, the hot case conditions may be assumed and the initial gas tank temperature and the initial gas pressure of the tank may be set accordingly for computing the mass-averaged gas filling temperature so as to avoid the overheating of the gas tank at the end of the filling process. Thus, it may be conservatively assumed that the temperature of the gas in the gas tank is higher than the ambient temperature by a certain value, e.g. 10° C. The ambient temperature may be measured by a gas refilling station. Further, for taking into account the possibility that the gas tank may have undergone an aborted fill just before the fill being carried out, the initial gas tank pressure value may be set to be a lowest allowable one, e.g. 0.5 MPa, in order to determine a maximum filling temperature for the fill as if it was the continuation of a hypothetical aborted fill starting from the lowest possible initial tank pressure.

Then, under the hot case conditions, the maximum mass-averaged gas filling temperature $MAT_{max}$ that may be applied such that the material temperature may not exceed the maximum allowable temperature, e.g. 85° C. at the end of filling process may be determined.

The maximum mass-averaged gas filling temperature $MAT_{max}$ may be determined by means of any known thermal behavior simulation tool which allows to predict the temperature increase of the gas in the tank and/or gas tank material by iterations: The simulation tool may comprise a numerical model calculating the temperature of the gas together with the transient heat conduction into the wall of the gas tank vessel, assuming homogeneous temperature of the gas and unidirectional heat transfer in the wall, e.g. composed of two layers of the liner and the wrapping in composite material. For each possible constant filling temperature and the ambient temperature, the final temperature of the gas in the tank and/or gas tank material may be computed using the thermal behavior simulation tool for the tank type and a look-up table for the computation may be provided. By constraining the final temperature to be at the highest 85° C., the allowable maximum mass-averaged gas filling temperature $MAT_{max}$ may be chosen.

Alternatively or additionally, the maximum mass-averaged gas filling temperature can be determined on the basis of an analytical model including adiabatic boundary conditions at the transition from the gas volume of the gas tank to the gas tank material, based on the relation between a gas temperature increase in the tank under the adiabatic boundary conditions and a temperature increase of the gas or the gas tank material which may be described by the following equation:

[Math. 5]

$$\Delta T_J / \Delta T_A = a_J P_i + b_J, \quad (5)$$

where $\Delta T_A$ is temperature increase of the gas in the tank under the adiabatic boundary conditions, $\Delta T_J$ is temperature increase of the gas or the gas tank material, with J denoting gas or gas tank material, $a_J$ and $b_J$ are fixed parameters specific to tank characteristics and the predetermined filling time $t_{fill}$, and $P_i$ is an initial gas pressure in the gas tank.

The fixed parameters $a_J$ and $b_J$ may be determined for the gas and/or the liner material by linear regression on the temperature predictions provided by a thermal behaviour simulation tool applied to the Type 4 hydrogen tank, for the nominal filling rate selected.

Using Equation (5) and the hot case conditions, the maximum allowable adiabatic temperature increase may be determined from the maximum allowable liner temperature increase (e.g. 65° C. if the initial temperature considered in the hot case conditions is 20° C. and the maximum allowable liner temperature at the end of filling process is 85° C.), providing the maximum allowable gas temperature assuming the adiabatic boundary conditions.

Then, the specific internal energy value of the gas in the tank may be determined for the initial conditions using a linear approximation which provides the specific internal energy in function of gas temperature and gas pressure of the tank and the data available to the public on temperature of the gas tank material and the gas in the gas tank during a gas refilling process. Also, the specific internal energy value of the gas in the tank after the tank is filled to a state of charge of 100% under the adiabatic boundary conditions may be determined.

Next, applying the first law of thermodynamics, the maximum specific enthalpy of the gas to be added to the gas tank under the adiabatic boundary conditions which provides the determined specific internal energy value of the gas in the tank after the tank is filled to the state of charge of 100% may be determined.

Finally, using a linear approximation of the specific enthalpy of the gas in function of temperature and pressure, and considering pressure drop in the piping down-stream of the point where the filling temperature is measured, as well as the thermal capacity of tank system piping resulting in a certain amount of energy input to the gas (which depends on the filling temperature), the maximum mass-averaged gas filling temperature $MAT_{max}$ may be determined providing the maximum specific enthalpy of the gas added at the vessel inlet of the tank.

After the maximum mass-averaged gas filling temperature is determined, in step S30, a target gas filling temperature $MAT_{target}$ may be selected which is equal to or lower than the maximum mass-averaged gas filling temperature $MAT_{max}$. The target gas filling temperature $MAT_{target}$ may be selected by taking the actual conditions of the gas supply system, e.g. in the gas refilling station into account. For instance, the ambient temperature in the gas refilling station may be so low that the target gas filling temperature $MAT_{max}$ cannot be reached for the filling gas without heating the gas; it may be practical to select a target gas filling temperature $MAT_{target}$ lower than the maximum mass-averaged gas filling temperature $MAT_{max}$. The gas to be supplied to the gas tank may be then cooled to the target gas filling temperature $MAT_{target}$ in step S40 and supply of the gas cooled to the gas tank may be initiated.

In step S50, the mass averaged gas filling temperature actually provided MAT may be determined by measuring the actual temperature of the gas supplied to the tank.

In step S60, cold case conditions may be assumed and the initial gas tank temperature and the initial gas pressure in the tank may be set accordingly for determining the end-of-fill pressure so as to avoid the overfill of the gas tank at the end of the filling process. As a lower initial temperature may allow supply of more gas, it may be conservatively assumed that the initial gas tank temperature is a predetermined lowest value, e.g. −40° C. The initial pressure may be set as a value measured, e.g. by a pressure sensor installed in the gas tank or the gas supply system. Then, the end-of-fill pressure $P_{fill}$ to be applied for reaching a predetermined maximum allowable state of charge, e.g. 107%, in the cold case conditions may be determined from the actual mass-averaged gas filling temperature MAT.

The end-of-fill-pressure may be determined by means of any known thermal behavior simulation tool which allows to predict the temperature increase of the gas and/or gas tank material by iterations. The simulation tool may be a numerical model calculating the temperature of the gas together with the transient heat conduction into the wall of the gas tank vessel, assuming homogeneous temperature of the gas and unidirectional heat transfer in the wall, e.g. composed of two layers of the liner and the wrapping in composite material. A look-up table may be prepared in advance providing the end-of-fill pressure $P_{fill}$ for each possible value of applied mass-averaged gas filling temperatures and for each possible value of initial gas pressures in the gas tank. From the look-up table, the end-of-fill-pressure may be determined for a given tank Type, the applied mass-averaged gas filling temperature and the initial gas pressure in the tank measured.

Alternatively or additionally, the end-of-fill-pressure can be determined on the basis of an analytical model including adiabatic boundary conditions at the transition from the gas volume of the gas tank to the gas tank material, based on the relation between a gas temperature increase in the tank under the adiabatic boundary conditions and a temperature increase of the gas or the gas tank material which may be described by the following equation:

[Math. 6]

$$\Delta T_J/\Delta T_A = a_J P_i + b_J, \quad (6)$$

where $\Delta T_A$ is a gas temperature increase in the tank under the adiabatic boundary conditions, $\Delta T_J$ is a temperature increase of the gas or the gas tank material, with J indicating gas or gas tank material, $a_J$ and $b_J$ are fixed parameters specific to tank characteristics and the predetermined filling time, and $P_i$ is an initial gas pressure in the gas tank.

The fixed parameters $a_J$ and $b_J$ of Equation (6) may be determined for the cold case conditions by linear regression on the temperature predictions provided by a thermal behaviour simulation tool applied to this design, for the selected filling rate, e.g. nominal fill in 3 minutes.

Then, assuming that the mass averaged filling temperature at the end of fill is the currently measured value of the mass-averaged gas filling temperature MAT, the end-of-fill pressure $P_{fill}$ providing a target end-of-fill state of charge, e.g. 107%, may be determined.

After the $P_{fill}$ is determined, the supply of gas may be terminated in step S70, when the gas pressure in the tank reaches the end-of-fill pressure $P_{fill}$ or a predetermined maximum filling pressure, e.g. 87.5 MPa, whichever is lower.

Figure 6:
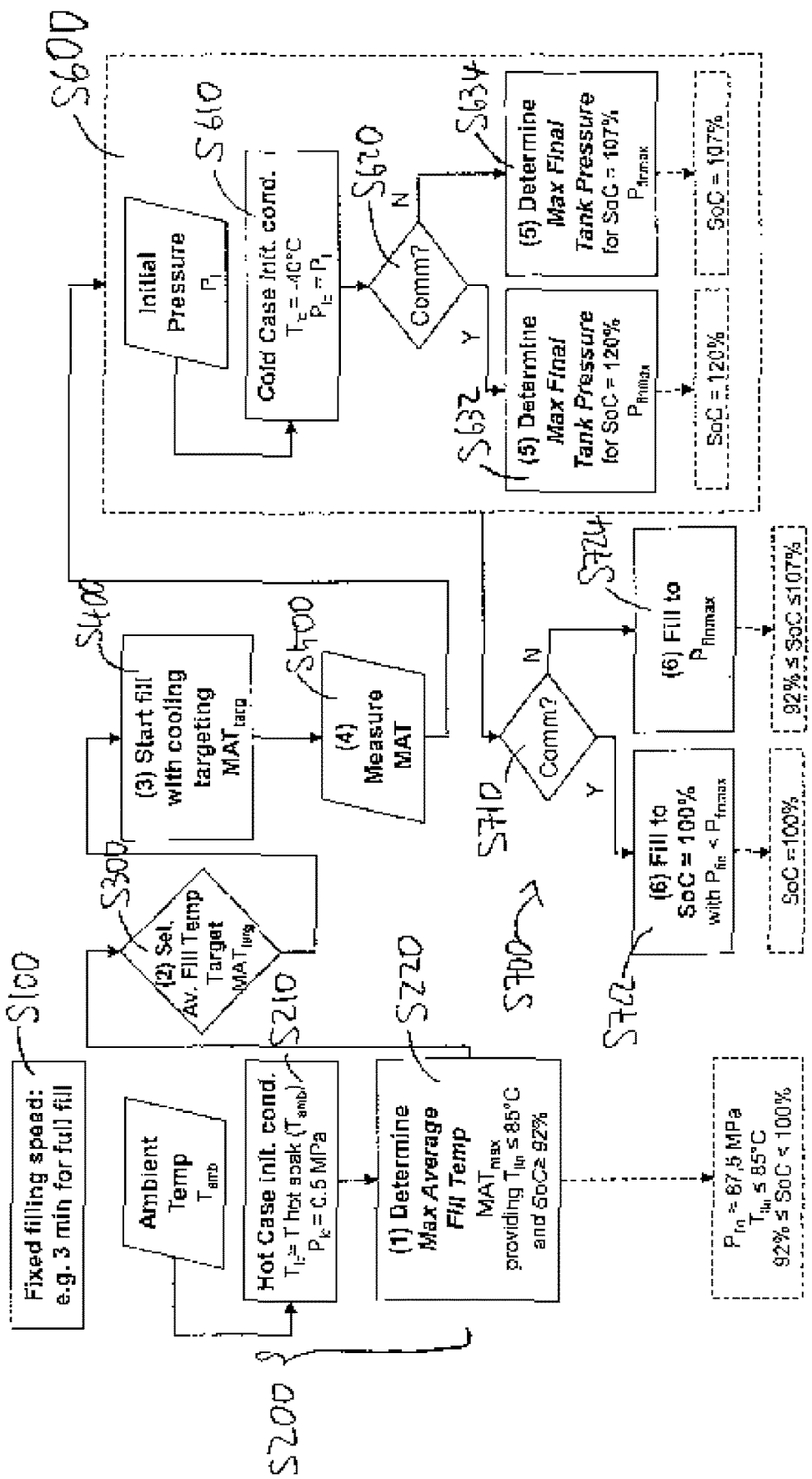
FIG. 6 shows a block diagram of another embodiment of the process for filling a gas tank according to the present invention. For the sake of simplicity, the embodiment is explained with an example of a hydrogen gas tank of Type 4.

FIG. 6 shows a block diagram of another embodiment of the process for filling a gas tank according to the present invention. For the sake of simplicity, the embodiment is explained with an example of a hydrogen gas tank of Type 4. However, the embodiment is applicable to other gas to be filled in a gas tank as well as other types of gas tanks such as Type 2 or Type 3 tanks. The steps corresponding to the steps according to the first embodiment are designated by the same reference numerals as in FIG. 5, however multiplied by 10. Moreover, the steps of the gas filling process in FIG. 6 are described only insofar as they differ from the steps of the gas filling process of FIG. 5. For the remaining description, it is hereby explicitly referred to the description of FIG. 5.

The filling process shown in FIG. 6 differs from the filling process in FIG. 5 in that the process may further comprise the step of determining whether or not information transmitted from the gas tank to be filled is available, e.g. to the gas supply system.

In step S600, the end-of-fill pressure $P_{fill}$ to be applied is determined from the actual mass-averaged gas filling temperature MAT. The step S600 may comprise three sub-steps, namely, S610, S620 and S632 or S634:

In step S610, the cold case conditions may be assumed and the initial gas tank temperature and the initial gas pressure in the tank may be set accordingly. In particular, the initial gas tank temperature in the tank may be set to be −40° C. and the initial gas pressure in the tank may be set as the value measured, e.g. by a pressure sensor measuring the counter pressure needed to start injecting gas into the gas tank.

In step S620, it may be determined whether information from the gas tank to be filled is available at the gas supply system, i.e. whether there is a communication between the gas tank and the gas supply system. If the information is determined to be available (step S632), a state of charge in the gas tank to be achieved at the end of filling process may be set based on the information. Alternatively, the state of charge value in the gas tank to be achieved may be set to be a maximum allowable value, e.g. 120%, i.e. a safety measure for ensuring termination of the process even if the information transmitted from the gas tank is wrong. The maximum final fill pressure $P_{fmax}$ may be determined based on the state of charge which was set.

If information is determined not available (step S634), the state of charge in the gas tank to be achieved at the end of filling process may be set more conservatively, e.g 107%. The maximum final fill pressure $P_{fmax}$ may be determined based on the state of charge set.

In step S700, the supply of gas is terminated. The step S700 may comprise two substeps S710 and S722 or S724.

In step S710, it may be determined whether information from the gas tank to be filled is available or not.

If the information is available, in step S722, the supply of gas may be terminated when the state of charge becomes 100%. The actual gas pressure of the gas tank at the end of the filling process $P_{fin}$ may be lower than the maximum final fill pressure $P_{finmax}$.

If the information is determined not available, in step S724, the supply of gas may be continued until the actual pressure of the gas tank becomes equal to the maximum final fill pressure $P_{finmax}$ As a result, the state of charge value at the end of filling process may be a value between 92% and 107%.

The invention claimed is:

1. A process for filling a gas tank made from a gas tank material with gas, the process comprising the steps:
   a) setting a nominal gas filling rate such that the gas tank is substantially completely filled within a predetermined filling time from a predetermined initial gas pressure value,
   b) determining, assuming hot case tank conditions, a maximum mass-averaged gas filling temperature that will be reached at an end of a filling process, when filling the gas tank for the predetermined filling time with the nominal gas filling rate,
   c) selecting a target gas filling temperature not greater than the maximum mass-averaged gas filling temperature,
   d) cooling the gas to be supplied to the gas tank to the target gas filling temperature,
   e) starting supply of gas to the gas tank,
   f) determining an actual mass-averaged gas filling temperature of the gas supplied to the gas tank,
   g) estimating an end-of-fill gas pressure from the actual mass-averaged gas filling temperature assuming cold case tank conditions, and
   h) terminating the supply of gas to the gas tank when an actual pressure of the gas tank is equal to a lower of the end-of-fill gas pressure and a maximum final fill pressure.

2. The process according to claim 1, wherein the step b) further comprises the steps:
   ba) determining the maximum mass-averaged gas filling temperature by means of a thermal behavior simulation tool which predicts a temperature increase of the gas in the gas tank and/or the gas tank material by iterations; and
   bb) providing a look-up table of the maximum mass-averaged gas filling temperature for each possible ambient temperature and for each possible value of initial gas pressure in the gas tank.

3. The process according to claim 2, wherein the step b) further comprises the steps:
   bc) determining, on the basis of an analytical model including adiabatic boundary conditions at the transition from the gas volume of the gas tank to the gas tank material, a relation between enthalpy of the gas added to the gas tank with a specific filling rate and a temperature of the gas in the gas tank and/or of the gas tank material at a time by which the gas has been added to the gas tank, assuming the hot case tank conditions; and
   bd) determining the maximum mass-averaged gas filling temperature from a predetermined maximum allowable temperature of the gas in the gas tank or the gas tank material at the end of the filling process, assuming the hot case tank conditions and using the relation determined in the step bc).

4. The process according to claim 3, wherein the step b) further comprise
   be) determining, on the basis of the analytical model including adiabatic boundary conditions at the transition from the gas volume of the gas tank to the gas tank material, a relation between temperature increase of the gas in the gas tank under the adiabatic boundary conditions and temperature increase of the gas tank material and/or of the gas in the gas tank; and
   bf) determining the maximum mass-averaged gas filling temperature from the predetermined maximum allowable temperature of the gas in the gas tank or of the gas tank material at the end of the filling process, assuming the hot case tank conditions and using the relation determined in the step be).

5. The process according to claim 4, wherein the step b) further comprises
   bg) determining a maximum allowable gas temperature under the adiabatic boundary conditions from a maximum allowable temperature increase of the gas tank material which is obtainable assuming the hot case tank conditions from the predetermined maximum allowable temperature of the gas tank material at the end of the filling process when filling the gas tank for the predetermined filling time with the nominal gas filling rate;
   bh) determining an initial specific internal energy of the gas in the gas tank for the hot case tank conditions;
   bi) determining, assuming that the gas tank is filled to a predetermined state of charge, under the adiabatic boundary conditions, a maximum specific internal energy of the gas for the determined maximum allowable gas temperature under the adiabatic boundary conditions;
   bj) determining, by applying the first law of thermodynamics, a maximum specific enthalpy of the gas to be added to the gas tank such that the specific internal energy of the gas at the end of the filling process does not exceed the maximum specific internal energy of the gas; and
   bk) determining the maximum mass-averaged gas filling temperature on the basis of the maximum specific enthalpy.

6. The process according to claim 4, wherein a relation between a gas temperature increase in the gas tank under the adiabatic boundary conditions and a temperature increase of the gas in the gas tank or a temperature increase of the gas tank material is defined by the following equation:

$$\Delta T_J / \Delta T_A = a_J P_i + b_J,$$

where $\Delta T_A$ is a temperature increase of the gas in the gas tank under the adiabatic boundary conditions, $\Delta T_J$ is a temperature increase of the gas in the gas tank or a temperature increase of the gas tank material with J denoting the gas or the gas tank material, $a_J$ and $b_J$ are fixed parameters specific to tank characteristics and a predetermined filling time, and $P_i$ is an initial gas pressure in the gas tank.

7. The process according to claim 4, wherein a relation between a gas temperature increase in the gas tank under the adiabatic boundary conditions and a temperature increase of the gas in the gas tank or a temperature increase of the gas tank material is defined by the following equation:

$$\Delta T_J / \Delta T_A = [(aa_1/\varphi_3 + ba_1)\log(\varphi_1/c_1\varphi_3) + (aa_0/\varphi_3 + ba_0)] / (\varphi_2/c_1\varphi_3)^{0.5} + [(ab_1/\varphi_3 + bb_1)\log(\varphi_1/c_1\varphi_3) + (ab_0/\varphi_3 + bb_0)]$$

where $\Delta T_A$ is a temperature increase of gas in the gas tank under the adiabatic boundary conditions, $\Delta T_J$ is a temperature increase of the gas in the gas tank or a temperature increase of the gas tank material with J denoting the gas or the gas tank material, and $\varphi_1$, $\varphi_2$ and $\varphi_3$ are parameters defined as $\varphi_1 = \varepsilon v T_f t_f^{0.5}/P_i$, $\varphi_2 = hvT_f t_f/P_i$, $\varphi_3 = P_n/P_i$, with $T_f$ denoting a gas filling temperature, $P_i$ denoting an initial gas pressure in the gas tank, h denoting a gas-to-tank material heat transfer coefficient, $t_f$ denoting a predetermined filling time, $P_n$ denoting a nominal fill pressure, $\varepsilon$ denoting a tank material effusivity and v denoting a tank vessel volume to internal area ratio, and $aa_1$, $ba_1$, $aa_0$, $ba_0$, $ab_1$, $bb_1$, $ab_0$, $bb_0$, and $c_1$ are constants.

8. The process according to claim 1, wherein the step f) further comprises:
   fa) measuring an actual temperature of the gas supplied to the gas tank, and
   fb) estimating the actual mass-averaged gas filling temperature on the basis of the amount of gas supplied to the gas tank in each time interval since starting the supply of gas to the gas tank and the respectively measured temperature of the gas supplied.

9. The process according to claim 1, wherein the step g) further comprises:
   ga) determining the end-of-fill gas pressure by means of a thermal behavior simulation tool predicts a temperature increase of the gas in the gas tank and/or of the gas tank material by iterations; and
   gb) providing a look-up table for the end-of-fill gas pressure for each possible value of applied mass-averaged gas filling temperatures and for each possible value of initial gas pressures in the gas tank.

10. The process according to claim 9, wherein determining the end-of-fill gas pressure in step g) comprises the following steps:
   gc) determining, on the basis of an analytical model including adiabatic boundary conditions at the transition from the gas volume of the gas tank to the gas tank material, a relation between temperature increase of the gas in the gas tank under the adiabatic boundary conditions and a temperature increase of the gas tank material and/or of the gas in the gas tank;
   gd) estimating, assuming that the maximum mass-averaged gas filling temperature is the actual mass-averaged gas filling temperature at the end of the filling process and by applying the first law of thermodynamics, the end-of-fill gas pressure based on the relation determined in the step gc) such that a predetermined state of charge in the gas tank is achieved at the end of the filling process.

11. The process according to claim 10, wherein a relation between a gas temperature increase in the gas tank under the adiabatic boundary conditions and a temperature increase of the gas in the gas tank or a temperature increase of the gas tank material is defined by the following equation:

$$\Delta T_J/\Delta T_A = a_J P_i + b_J,$$

where $\Delta T_A$ is a temperature increase of the gas in the gas tank under the adiabatic boundary conditions, $\Delta T_J$ is a temperature increase of the gas in the gas tank or a temperature increase of the gas tank material with J denoting gas or gas tank material, $a_J$ and $b_J$ are fixed parameters specific to tank characteristics and the predetermined filling time, and $P_i$ is an initial gas pressure in the gas tank.

12. The process according to claim 10, wherein a relation between a gas temperature increase in the gas tank under the adiabatic boundary conditions and a temperature increase of the gas in the gas tank or a temperature increase of the gas tank material is defined by the following equation:

$$\Delta T_J/\Delta T_A = [(aa_1/\varphi_3 + ba_1)\log(\varphi_1/c_1\varphi_3) + (aa_0/\varphi_3 + ba_0)] \Big/$$
$$(\varphi_2/c_1\varphi_3)^{0.5} + [(ab_1/\varphi_3 + bb_1)\log(\varphi_1/c_1\varphi_3) + (ab_0/\varphi_3 + bb_0)]$$

where $\Delta T_A$ is a temperature increase of gas in the gas tank under the adiabatic boundary conditions, $\Delta T_J$ is a temperature increase of the gas in the gas tank or a temperature increase of the gas tank material with J denoting gas or gas tank material, and $\varphi_1$, $\varphi_2$ and $\varphi_3$ are parameters defined as $\varphi_1 = \varepsilon v T_f t_f^{0.5}/P_i$, $\varphi_2 = hvT_f t_f/P_i$, $\varphi_3 = P_n/P_i$, with $T_f$ denoting a gas filling temperature, $P_i$ denoting an initial gas pressure in the gas tank, h denoting a gas-to-tank material heat transfer coefficient, $t_f$ denoting a predetermined filling time, $P_n$ denoting a nominal fill pressure, $\varepsilon$ denoting a tank material effusivity and v denoting a tank vessel volume to internal area ratio, and $aa_1$, $ba_1$, $aa_0$, $ba_0$, $ab_1$, $bb_1$, $ab_0$, $bb_0$, and $c_1$ are constants.

13. The process according to claim 1, wherein the step g) further comprises determining whether information transmitted from the gas tank to be filled is available and, if the information is available, determining a state of charge in the gas tank to be achieved at the end of the filling process based on the information, and determining the end-of-fill gas pressure and/or the maximum final fill pressure further based on the state of charge determined.

14. The process according to claim 5, wherein a relation between a gas temperature increase in the gas tank under the adiabatic boundary conditions and a temperature increase of the gas in the gas tank or a temperature increase of the gas tank material is defined by the following equation:

$$\Delta T_J/\Delta T_A = a_J P_i + b_J,$$

where $\Delta T_A$ is a temperature increase of the gas in the gas tank under the adiabatic boundary conditions, $\Delta T_J$ is a temperature increase of the gas in the gas tank or a temperature increase of the gas tank material with J denoting gas or gas tank material, $a_J$ and $b_J$ are fixed parameters specific to tank characteristics and a predetermined filling time, and $P_i$ is an initial gas pressure in the gas tank.

15. The process according to claim 5, wherein a relation between a gas temperature increase in the gas tank under the adiabatic boundary conditions and a temperature increase of the gas in the gas tank or a temperature increase of the gas tank material is defined by the following equation:

$$\Delta T_J/\Delta T_A = [(aa_1/\varphi_3 + ba_1)\log(\varphi_1/c_1\varphi_3) + (aa_0/\varphi_3 + ba_0)] \Big/$$
$$(\varphi_2/c_1\varphi_3)^{0.5} + [(ab_1/\varphi_3 + bb_1)\log(\varphi_1/c_1\varphi_3) + (ab_0/\varphi_3 + bb_0)]$$

where $\Delta T_A$ is a temperature increase of gas in the gas tank under the adiabatic boundary conditions, $\Delta T_J$ is a temperature increase of the gas in the gas tank or a temperature increase of the gas tank material with J denoting gas or gas tank material, and $\varphi_1$, $\varphi_2$ and $\varphi_3$ are parameters defined as $\varphi_1 = \varepsilon v T_f t_f^{0.5}/P_i$, $\varphi_2 = hvT_f t_f/P_i$, $\varphi_3 = P_n/P_i$, with $T_f$ denoting a gas filling temperature, $P_i$ denoting an initial gas pressure in the gas tank, h denoting a gas-to-tank material heat transfer coefficient, $t_f$ denoting a predetermined filling time, $P_n$ denoting a nominal fill pressure, $\varepsilon$ denoting a tank material effusivity and ν denoting a tank vessel volume to internal area ratio, and $aa_1$, $ba_1$, $aa_0$, $ba_0$, $ab_1$, $bb_1$, $ab_0$, $bb_0$, and $c_1$ are constants.

16. The process according to claim 5, wherein the step g) further comprises determining whether information transmitted from the gas tank to be filled is available and, if the information is available, determining a state of charge in the gas tank to be achieved at the end of the filling process based on the information, and determining the end-of-fill gas pressure and/or the maximum final fill pressure further based on the state of charge determined.

17. The process according to claim 8, wherein the step g) further comprises determining whether information transmitted from the gas tank to be filled is available and, if the information is available, determining a state of charge in the gas tank to be achieved at the end of the filling process based on the information, and determining the end-of-fill gas pressure and/or the maximum final fill pressure further based on the state of charge determined.

18. The process according to claim 10, wherein the step g) further comprises determining whether information transmitted from the gas tank to be filled is available and, if the information is available, determining a state of charge in the gas tank to be achieved at the end of the filling process based on the information, and determining the end-of-fill gas pressure and/or the maximum final fill pressure further based on the state of charge determined.

* * * * *